INVENTOR
EDWARD ARTHUR BENJAMIN BATES
BY Young & Thompson
ATTYS.

INVENTOR
EDWARD ARTHUR BENJAMIN BATES
BY Young + Thompson
ATTYS.

United States Patent Office 3,614,890
Patented Oct. 26, 1971

3,614,890
PROBE MANIPULATORS FOR ULTRASONIC FLAW DETECTION APPARATUS
Edward Arthur Benjamin Bates, London, England, assignor to Glass Developments Limited, London, England
Filed Nov. 29, 1968, Ser. No. 779,963
Claims priority, application Great Britain, Nov. 29, 1967, 54,391/67
Int. Cl. G01n 24/00
U.S. Cl. 73—71.5    10 Claims

ABSTRACT OF THE DISCLOSURE

Ultrasonic flaw testing apparatus is disclosed for dealing with stepped or other discontinuous surfaces. The probe carriage has inner and outer fork members sprung apart with the probe pivotally mounted across the limbs of the inner fork and maintained in a predetermined position by a balance weight. Wheels are mounted at the ends of the limbs of the outer fork for engagement with the surface of the specimen under test the probe being maintained in a predetermined position with respect of the surface by the spring between the forks and the balance weight acting on the pivot. The carriage is slidably mounted on an arm and is urged by a second spring against the surface, microswitches controlling an electric motor for moving the arm being arranged to be actuated when the limits of movement under control of the second spring are exceeded.

---

The invention relates to manipulators for probes in ultrasonic flaw detection apparatus.

Ultrasonic flaw testing techniques can be applied to articles having a variety of surface shapes and it is of course desirable to arrange for the surface to be traversed by the ultrasonic probe assembly under mechanical control. Difficulties obviously occur in arranging for a probe assembly to maintain a desired orientation to the immediately adjacent surface during relative movement of the assembly and the surface when the latter is not a simple shape and in particular when steps or other discontinuities are included. It is accordingly the object of the present invention to provide a probe manipulator capable of maintaining a probe in a desired orientation on surfaces which are not of simple form.

The invention accordingly provides a probe manipulator for use in ultrasonic flaw testing apparatus, the manipulator having a bogie comprising an outer frame carrying support elements for engaging a surface of a specimen under test, an inner frame mounted on the outer frame for movement relative thereto, spring means acting between the frames for urging the inner frame into engagement with a surface engaged by the support elements, a probe mount pivotally supported on the inner frame, and means for urging the probe mount into a predetermined angular position with respect to the surface.

The invention also provides a probe manipulator for use in ultrasonic flaw testing apparatus, the manipulator comprising a main support, a main frame mounted for movement thereon, a bogie carrying a probe mount, the bogie being movably supported by the main frame, spring means acting between the main frame and the bogie to urge the bogie to move relatively to the main frame so as to present the probe mount to a surface of a specimen under test, and drive means responsive to such relative movement of the bogie beyond predetermined limits to move the main frame relative to the main support so as to restore the position of the bogie relative to the main frame within the limits.

Figure 1:
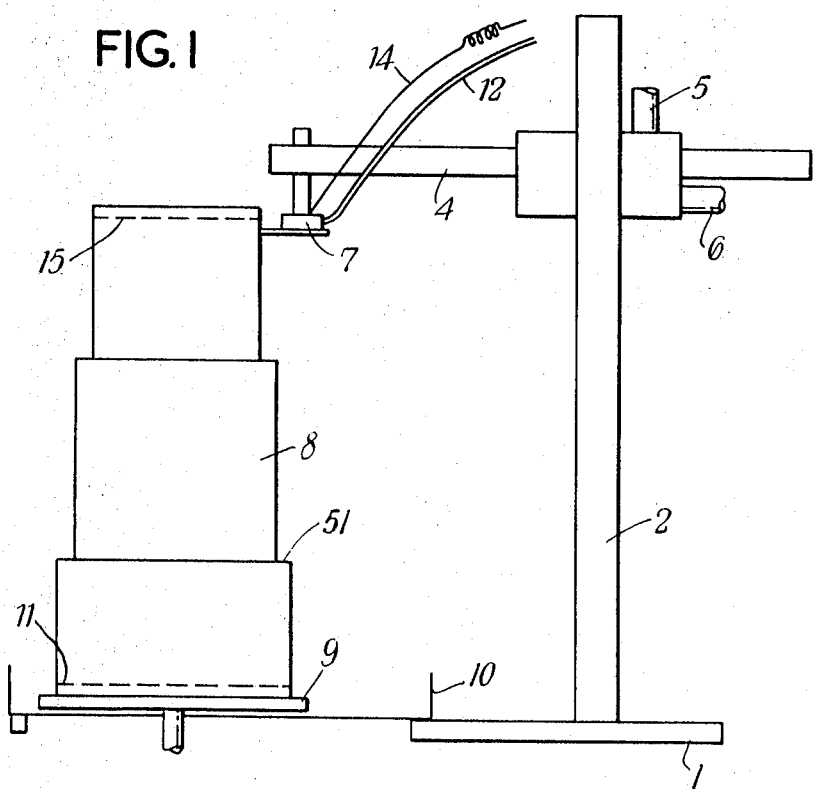
Figure 2:
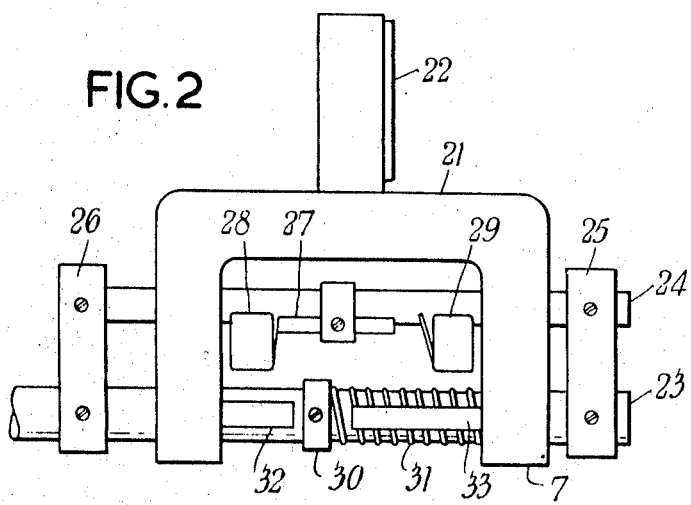
Figure 3:
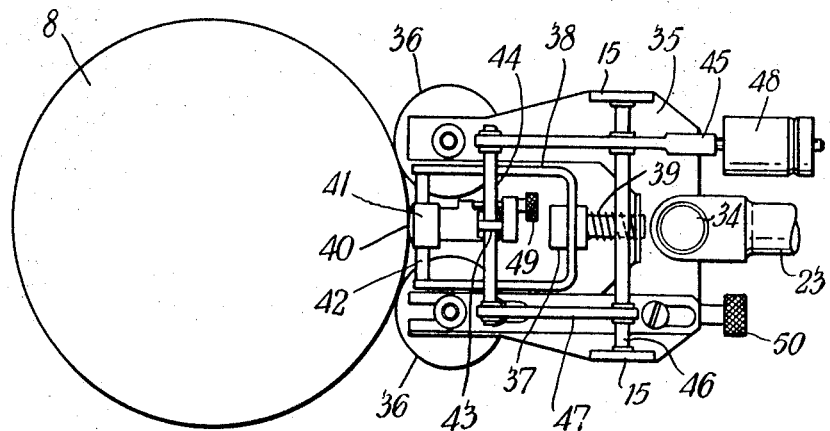
Figure 4:
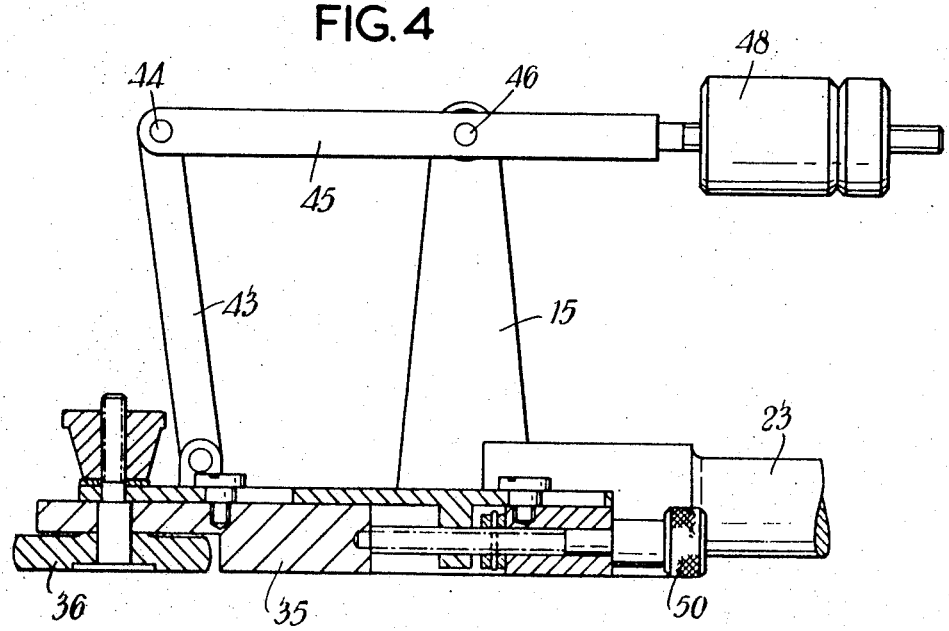

By way of example only, a probe manipulator apparatus embodying the invention is described below with reference to the accompanying drawings, in which:

FIG. 1 is a side view of the apparatus;
FIG. 2 is a side view on a larger scale of a part of the apparatus;
FIG. 3 is a partial plan view of the apparatus of FIG. 1 on the larger scale; and
FIG. 4 is a side view of another part of the apparatus on a still larger scale.

The illustrated flaw detection apparatus comprises a baseplate 1, supporting a vertical column 2, on which is mounted a horizontally extending arm 4, and electric motors 5 and 6. An ultrasonic probe is carried in a carriage 7 at the outer end of the arm 4.

The apparatus is shown arranged for inspecting a specimen in the form of a stepped shaft 8 which is mounted on a turntable 9 set in a water catchment tray 10. The shaft 8 and the turntable 9 are preferably coaxial but the illustrated manipulator will operate satisfactorily even though the shaft is not properly centered. The turntable 9 is driven at a convenient speed to rotate the shaft 8 by a suitable drive apparatus including an electric motor and associated electrical arrangements (not shown).

Operation of the motor 6 raises or lowers the arm 4 by the engagement of a pinion on the motor drive shaft with a rack on the column 2, the direction of movement being dependent on the connections and switching in a circuit in which the motor is connected. By a similar mechanism, operation of the motor 5 extends or retracts the arm 4. Other arrangements employing for example chains and sprockets, endless tape bands, or leadscrews, can of course be used for extending and retracting, and raising and lowering the arm 4 and thus the probe carriage 7.

The rotation of the motor 6 is synchronised with the rotation of the turntable 9 in such a way that, supposing the probe to be commencing inspection near the base of the shaft 8 on the turntable at a level 11, a helical inspection path is described over the entire surface of the shaft 8. Articles shaped as is the shaft 8 are best inspected with the helix embracing successively smaller diameters as inspection proceeds, although the carriage 7 can be arranged to make outward steps as well as inward ones. FIG. 1 shows the arm at the end of its helical scan at a level 15. The synchronisation can be adjusted to obtain a fine or a coarse pitched helix, as desired.

To provide acoustic coupling between the probe and the shaft 8, a pipe 12 provides water under pressure to irrigate the surface under the probe. Electrical connection to the probe is made by means of a lead 14. Not shown in FIG. 1 are adjustable microswitches which sense the position of the arm 4 in the vertical direction and set the initial level 11 and the final level 15 by switching the motor 6.

FIGS. 2, 3 and 4 show the probe carriage 7 in detail. As appears from FIG. 2, the carriage has a yoke 21 which is fixed to the arm 4 by means of a keyed spigot 22. Sliding in bearings in the arms of the yoke 21 are two parallel shafts 23 and 24. One end of the shaft 23 holds the probe bogie, as shown in FIG. 3. The shaft 24 is locked to the shaft 23 by straps 25 and 26 so as to move with it, and holds an operating finger 27 which bears at one end of the movement of the shaft 24, against a microswitch 28 and at the other end of the movement against a microswitch 29, the microswitches being fixed with respect to the yoke 21. A collar 30 around the shaft 23 acts as a shoulder compressing a spring 31 against one arm of the yoke. The collar 30 also bears against end stops 32 and 33 at the ends of the movement of the shaft 23 and 24, so preventing excessive over-travel should a fault occur in the control gear.

The probe bogie shown in plan in FIG. 3 comprises a yoke 35 pivoted at 34 to the end of the shaft 23. At the extremities of the arms of the yoke 35, wheels 36 are mounted for free rotation. Fixed to the shaft 23, inside the yoke 35, is a shaft 37 on which an inner yoke 38 can slide, the inner yoke being urged outwards by a spring 39. A probe tube 41 is carried at the outer ends of the arms of the inner yoke 38 and will be the first part of the assembly to encounter the surface of the specimen 8 at 40 as the shaft 23 is moved forward. The probe tube 41 is pivoted across the arms of the yoke 38 on a shaft 42, the actual probe being recessed inside the tube so that it is the tubes open end which actually slides on the surface 40.

FIG. 4 is a side view of a probe counterbalance system carried by the yoke 35. The system comprises an upright link 43 pivoted at its lower end to the probe tube 41 and at its upper end to the middle of a transverse shaft 44. Parallel arms 45, 47 are pivotally connected one at each end of the shaft 44 and extend to a second transverse shaft 46 pivotally mounted at its ends by uprights 15 of the yoke 35. The arm 45 extends beyond the shaft 46 to support a counterbalance weight 48 at its end. By adjusting the position of the counterbalance weight 48 along the shaft 45, the equilibrium position of the probe tube 41 is arranged to be such that its axis is normal to the axis of shaft 23. This enables the probe to tilt as the bogie moves over irregularities such as the shoulder 51 of the shaft 8 and to return to the correct orientation when the shoulder has been passed. The probe and tube stay normal to the surface once they have been so positioned by adjustment of a setting screw 50, which operates by moving one wheel 36 outwardly on a slotted bearing. The probe tube also stays in contact at its forward end, after this condition has been reached by adjustment of a setting screw 49 to decide the spacing of the probe from the specimen.

The sequence of operation is as follows:

The motors 5 and 6 are operated under manual control to lower and extend the arm 4 to bring the probe tube against the surface 40 at the level 11. As the bogie moves towards the surface, the probe tube engages first, centralising itself by means of the counterbalance system and by virtue of its flat open ended construction. Further movement compresses the spring 39 until the wheels 36 also engage.

Further outward movement of the arm 4 causes the arms to move relative to the shaft 23 by sliding of the yoke 21 along the shafts 23 and 24 under pressure from the drive of the motor 5. Eventually the microswitch 28 opens because of the disengagement of the finger 27. This breaks the power supply driving the motor 5. The rotational movement of the turntable 9 is then started manually and the synchronism with the upward movement imparted by the shaft 2 is established, giving rise to the helical scan.

Eventually the shoulder 51 is over-run and the support effect on the wheels of the surface 40, is lost. There is then no opposition to the tendency of the spring 31 to act on the collar 30 to slide the shaft 23 towards the specimen. When the probe tube and wheels 36 land on the surface 40 the inspection continues as before. If the depth of shoulder 51 is such that the shaft 23 moves sufficiently to operate microswitch 28 before this happens the operation of the switch energises the motor 5 to move the arm 4 in further towards the specimen as before, until the microswitch is opened by the finger 27 to switch off the motor 5.

This is repeated at all other shoulders on the specimen until level 15 (FIG. 1) is reached at which the microswitch for stopping the upwards movement is operated.

The wheels 36 have bevelled edges so that they do not slip rapidly over the shoulders, with consequent shock to the probe, but afford instead a slow transition. Further shock protection for the probe can be obtained if required by means of a piston and air damping cylinder acting on the moving system.

Since both faces of the wheels are bevelled the bogie will not only fall over a shoulder such as the shoulder 51, in rising from level 11 to level 15, if the shoulder is not too extreme, the bogie will also climb it when passing in the other direction. For such a movement the shaft 23 is required to retract and this is effected by the climbing motion of the wheel over the step which moves the shaft until the finger 27 closes microswitch 29. The consequent reverse motion of the motor 5 moves the yoke 21 inwards towards the column 2 until the microswitch again opens and motor 5 stops. This of course is the reverse of the previous action which produces outward motion on a step to a decreased diameter. It will be appreciated that the climbing action is limited to steps less than the width of the bevels on the wheels 36 unless the steps are tapered sections between parts of uniform but different diameters, that is, the steps are at angles less than 90° to the shaft axis. Larger steps may then be climbed. Undercut steps cannot be tackled unless very limited in height and the undercut does not upset the ultrasonic test. However, the profile of the wheels can be chosen to suit particular specimens so that quite extreme shoulders and changes of section can be traversed.

The total result of these mechanical arrangements, which can of course be varied within the scope of the invention, is to produce spring loading of the probe onto undulating or stepped surfaces at nearly constant spring tension irrespective of the amplitude of the undulations or the height of the steps, the probe being kept normal to the surface at any instant by a simple counterbalance.

I claim:

1. A probe manipulator bogie for use in ultrasonic flaw-testing apparatus adapted to move said bogie over a stepped surface of a specimen to be tested, the bogie comprising an outer frame, support elements mounted on said outer frame for engaging said surface of the specimen, an inner frame, means mounting said inner frame on said outer frame for movement relative thereto towards and away from said surface, spring means acting between the inner and outer frames to urge the inner frame into engagement with said surface, a probe mount supported on the inner frame for pivotation about a first axis, and counterbalance means adapted to urge the probe mount into a predetermined angular position about said first axis, whereby said angular position of said probe mount is resumed after the bogie has passed over a step in the surface.

2. A probe manipulator bogie as claimed in claim 1 in which the inner frame has the form of a yoke having a shaft extending between the limbs thereof, the probe mount being mounted for pivoting about the axis of the shaft.

3. A probe manipulator bogie as claimed in claim 1 having means for selectively adjusting the position of at least one of the support elements on the frame.

4. A probe manipulator bogie as claimed in claim 1 in which the outer frame has the form of yoke having wheels constituting the support element rotatably mounted at the ends of the limbs thereof.

5. A probe manipulator bogie as claimed in claim 4 in which the wheels are chamfered to facilitate movement thereof over irregularities in the surface of the specimen.

6. A probe manipulator for use in ultrasonic flaw testing of a discontinuous surface of a specimen, the manipulator comprising a base, a probe support, means mounting said probe support on said base for movement relative to the base for scanning the surface of the specimen, a bogie carrying a probe, means mounting the bogie on the support for movement towards and away from the surface, spring means acting between the support and the bogie to urge the bogie towards the surface, drive means adapted to move the support relative to the base towards and away from the surface, and switch means adapted to be operated on movement of said bogie relative to said support to either end of a predetermined range of said movement, said switch means controlling said drive means so that the support is moved by said drive means to maintain the bogie at a distance from said surface within said predetermined range of movement thereof relative to the support.

7. A probe manipulator as claimed in claim 6 in which the bogie is carried at one end of a shaft slidably journalled in the support, the spring means acting between the support and a projection on the shaft.

8. A probe manipulator as claimed in claim 6 in which the drive means comprises an electric motor controlled by switches on the support and arranged to be operated by an actuator carried by the bogie for movement therewith.

9. A probe manipulator as claimed in claim 6 in which the movement of the bogie relative to the support and of the support relative to the base are arranged to be horizontal, the support being also movable vertically relative to the base.

10. A probe manipulator as claimed in claim 9 in which the base comprises an upright, and the support is mounted for movement relative thereon by means of a horizontal arm supported for horizontal and vertical movement relative to the upright.

References Cited

UNITED STATES PATENTS

| | | | |
|---|---|---|---|
| 3,178,933 | 4/1965 | Bloch et al. | 73—67.8 |
| 3,225,136 | 12/1965 | Furon | 178—6.6 |
| 3,233,450 | 2/1966 | Fry | 73—67.8 |
| 3,266,300 | 8/1966 | Graboski | 73—67.8 X |
| 3,350,925 | 11/1967 | Coy | 73—71.5 |
| 3,455,150 | 7/1969 | Wood | 73—71.5 |
| 3,483,739 | 12/1969 | Gewartowski et al. | 73—67.8 |
| 3,190,112 | 6/1965 | Beaujard et al. | 73—67.8 X |

FOREIGN PATENTS

| | | | |
|---|---|---|---|
| 1,084,510 | 9/1967 | Great Britain | 73—71.5 |

RICHARD C. QUEISSER, Primary Examiner

A. E. KORKOSZ, Assistant Examiner

U.S. Cl. X.R.

73—67.8